United States Patent
Mattes et al.

(10) Patent No.: US 6,772,056 B2
(45) Date of Patent: Aug. 3, 2004

(54) DATA BUS FOR CONSTRAINT MEANS IN A VEHICLE

(75) Inventors: Bernhard Mattes, Sachsenheim (DE); Harald Kazmierczak, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 52 days.

(21) Appl. No.: 10/057,456

(22) Filed: Jan. 24, 2002

(65) Prior Publication Data

US 2002/0124123 A1 Sep. 5, 2002

(30) Foreign Application Priority Data

Jan. 24, 2001 (DE) .......................... 101 02 995

(51) Int. Cl.7 .............................................. G06F 13/00
(52) U.S. Cl. .................................... 701/45; 710/100
(58) Field of Search ........................... 701/45; 280/735, 280/728.1; 307/10.1; 340/870.31, 870.1; 710/100

(56) References Cited

U.S. PATENT DOCUMENTS

| | | | |
|---|---|---|---|
| 4,608,550 A | | 8/1986 | Umebayashi et al. ...... 307/10.1 |
| 4,653,073 A | * | 3/1987 | Vercellotti et al. .......... 375/340 |
| 5,329,258 A | * | 7/1994 | Matsuura ..................... 332/100 |
| 5,590,157 A | * | 12/1996 | Schuur ......................... 375/327 |
| 5,696,409 A | * | 12/1997 | Handman et al. .......... 307/10.1 |
| 5,893,031 A | * | 4/1999 | Hoogerwerf et al. ....... 455/410 |
| 6,012,736 A | * | 1/2000 | Hansen et al. .............. 280/735 |
| 6,016,104 A | * | 1/2000 | Dobler et al. ............... 340/646 |
| 6,218,924 B1 | * | 4/2001 | Zabler et al. ............... 336/120 |
| 6,549,120 B1 | * | 4/2003 | de Buda ................. 340/310.01 |

FOREIGN PATENT DOCUMENTS

| | | | | |
|---|---|---|---|---|
| DE | 195 20 063 | | 12/1996 | |
| DE | WO 99/16637 | * | 4/1999 | ............ B60N/2/00 |
| JP | 58 033 547 | | 2/1983 | |

\* cited by examiner

*Primary Examiner*—Marthe Y. Marc-Coleman
(74) *Attorney, Agent, or Firm*—Kenyon & Kenyon

(57) ABSTRACT

Data bus for constraint devices, which connects a control unit to the constraint devices, which are connected to the data bus via transformers. The data is then transmitted over the data bus using frequency shift keying signals. The constraint devices are each provided in removable seats. Upon activation of the constraint devices, a deployment signal is sent to the constraint devices over a power supply line.

7 Claims, 2 Drawing Sheets

DATA BUS FOR CONSTRAINT MEANS IN A VEHICLE

BACKGROUND INFORMATION

The use of removable seats in an increasing number of motor vehicles is known. This is especially true for vehicles which are known as vans or sports utility vehicles (SUVs) or off-road vehicles. Data relating to airbag diagnostics, airbag ignition, child seat detection and passenger classification is currently transmitted between the chassis and the respective removable seat over flexible cables and plug connectors. The alternative use of inductive transformers, thereby avoiding the disadvantages of plugs, is also known. In this case, the primary side of the transformer is connected to the chassis and the secondary side to the seat. The transformer is designed so that, when installed, it allows for maximum magnetic flux.

SUMMARY OF THE INVENTION

The data bus for constraint means according to the present invention has the advantage over the related art that it uses only one data bus to interconnect, for data transfer purposes, the constraint means in the different removable seats or in moving parts. This reduces the number of lines and allows for greater flexibility in responding to changes in the number of, or modifications to, constraint means. Because inductive transmission is used, it is particularly advantageous to use digital transmission with FSK (frequency shift keying) signals, which are easily transmittable via an inductive transformer in the form of AC voltage signals.

It is especially advantageous for the data to be transmitted in a format in which a start bit string is first transmitted, followed by a bus station identifier, and finally the information field for evaluating the bus station identified by the bus station identifier. The start bit string advantageously identifies the beginning of the data message. Via the bus station identifier, any bus station can passively determine whether or not the data message is destined for this bus station, using a simple comparator. The information field can advantageously provide tasks for a particular bus station or contain important information that a further bus station, such as the control unit, needs for further processing.

It is further advantageous, in the event of deployment of the constraint means, for the control unit to signal the deployment to the constraint means over a power supply line. Since the constraint means in this case are connected by transformers, this can be accomplished by a frequency pulse that is sent over the power supply line.

Finally, it is also advantageous for the bus stations connected to the data bus to include means for sending and receiving frequency shift keying signals, using, in particular, phase-locking loops, with these bus stations also using comparators to evaluate the bus station identifiers in the data messages.

DETAILED DESCRIPTION

To communicate with a removable seat, for example the passenger's seat, voltages for supplying power to the electronics and an energy reserve for airbag ignition as well as an ignition pulse line must be routed to the seat. This is necessary for using the coil spring of an inductive transformer. According to the present invention, therefore, a data bus for transmitting the necessary data is used in conjunction with multiple removable seats or moving parts.

Figure 4:
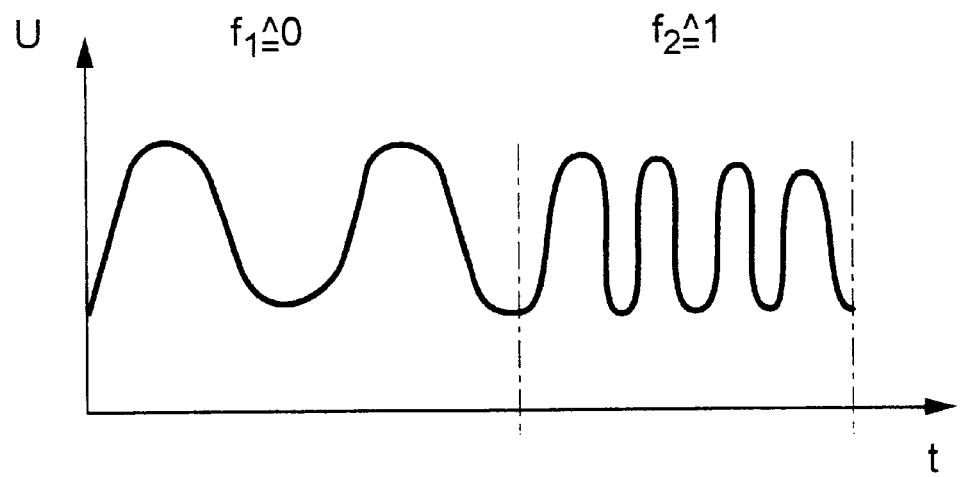
FIG. 4 shows the two FSK signals used.

Frequency shift keying is a form of digital frequency modulation that involves switching back and forth between two or more distinguishable frequencies. If only two frequencies are used, the process is closely analogous to digital transmission using one bit. In this case, one frequency is assigned the zero and another frequency a one. This is illustrated in FIG. 4. f1 represent the zero and is a lower frequency, while f2 represents a one, which, in this case, is transmitted at a higher frequency. The same time segments are always compared to each other to count the number of frequency pulses and thus identify the bit status. This procedure is known as frequency shift keying (FSK).

Figure 1:
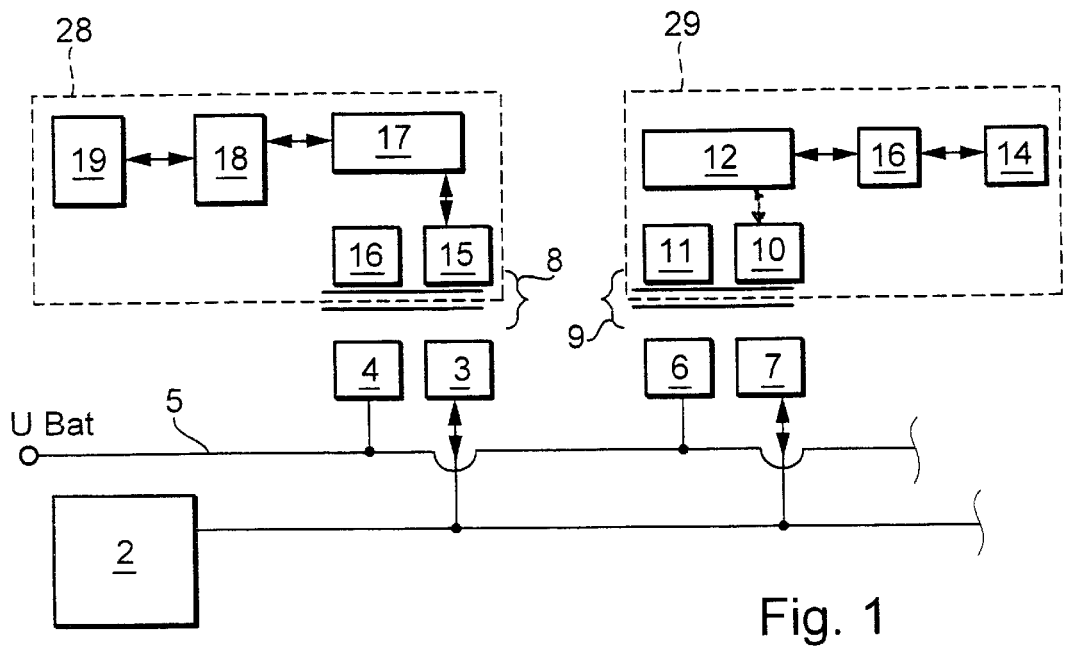
FIG. 1 shows a block diagram of the data bus according to the present invention with connected bus stations.

FIG. 1 shows the data bus according to the present invention having connected bus stations. Via inputs/outputs, a data bus 1 connects a control unit 2 for constraint means to devices for constraint means in two removable seats 28 and 29, which are connected to bus drivers 3 and 7 as well as to power supply units 4 and 6 via transformers 8 and 9. Bus drivers 3 and 7 on the primary side of transformers 8 and 9 are each connected to data bus 1 via data inputs/outputs. Power supply units 4 and 6 are each connected to a power supply line 5 that comes from control unit 2. Control unit 2 is set to battery voltage UBat. Transformers 8 and 9 in this case are implemented by coils on the primary and secondary sides, while an iron core may also be used.

A driver 15 and a power supply unit 16 are provided on the secondary side of transformer 8. Driver 15 is connected, via a data input/output, to a processor 17 which is connected, via a second data input/output, to an ignition circuit controller 18, which, in turn, is connected to constraint means 19 via its second data input/output. Power supply unit 16 supplies power to the components on secondary side 28.

A power supply unit 11 and a driver 10 that is connected to transformer 9 are provided on secondary side 29. Driver 10 is connected to a processor 12 which is connected, via its second data input/output, to an ignition circuit controller 13, which, in turn, is connected to constraint means 14 via its second data input/output. Power supply unit 11 supplies power to all components on secondary side 29.

Figure 3:
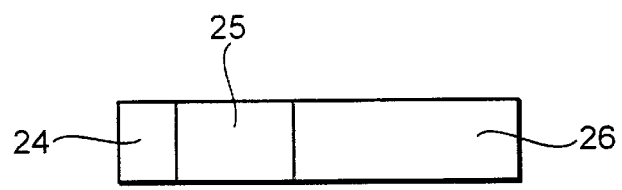
FIG. 3 shows a data message that is transmitted over the data bus according to the present invention.

The two power supply units 4 and 6 transmit power to corresponding power supply units 11 and 16 on the secondary side. The data flow over data bus 1 is forwarded from drivers 3 and 7 to drivers 15 and 10 on the secondary side. Processor 12 or 17 first performs a detection operation to determine whether a data message being transmitted over data bus 1 is beginning, by searching for start bit 24 as the start bit string as shown in FIG. 3. Processors 12 and 17 have corresponding means for this purpose, namely a comparator. If start bit 24 is detected, processor 12 or 17 evaluates an identification field 25 in which the processors compare their stored identifiers with this received identifier 25. If one bit differs continuously, the corresponding bus station is removed so that, in the end, only the bus station identified by identifier 25 remains.

The bus station matching the identifier provided in field 25 then evaluates subsequent information field 26. To do this, processor 12 or 17 evaluates the content and performs a corresponding task, possibly returning a data message, for example one containing necessary data relating to airbag diagnostics, a passenger classification state, a child seat query or a seatbelt lock detection. In the event of deployment, control unit 2 transmits a frequency pulse over power supply line 5 to individual constraint means 19 and 14, which are controlled by ignition circuit controllers 18 and 13, respectively. The frequency pulse is detected as an ignition command.

Constraint means 14 and 19 are airbags or belt tensioners. Deployment is therefore transmitted over power supply line 5 using a frequency pulse that is used for ignition circuit control. In addition, control unit 2 interrupts all other activities. Data indicating the delay interval after which ignition may take place and/or whether the constraint means are to be activated is then transmitted over data line 1.

Instead of using only one start bit, it is alternatively possible to use a start bit string, which increases the reliability of detecting the beginning of a data message. The comparator used for identification purposes has, in this case, comparing elements for performing the comparison. As an alternative, it is also possible to carry out this comparison using software.

Figure 2:
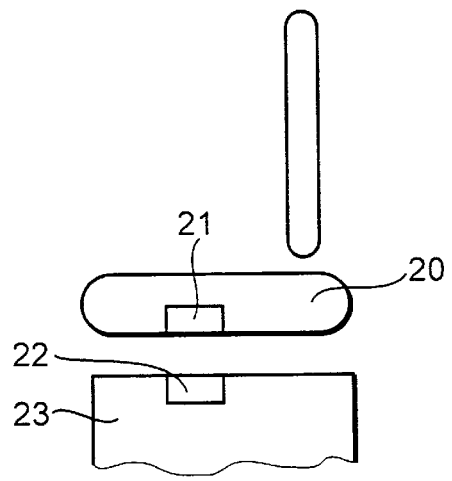
FIG. 2 shows a transformer that is used as the data and power connection between the seat and chassis.

FIG. 2 shows a schematic diagram to illustrate how a transformer connects a seat 20 to chassis 23. Primary side 22 is situated directly opposite secondary side 21, establishing a strong magnetic link. There is no mechanical connection. This ensures, in particular, the reliability of this connection as well as operability if seats are frequently removed and reinstalled. A contactless connection eliminates the danger of the user forgetting to reinsert the plug as well as the possibility of exceeding the specified number of plug-in cycles. For the sake of simplicity, the connected electronics in the chassis and the seat are not illustrated.

Figure 5:
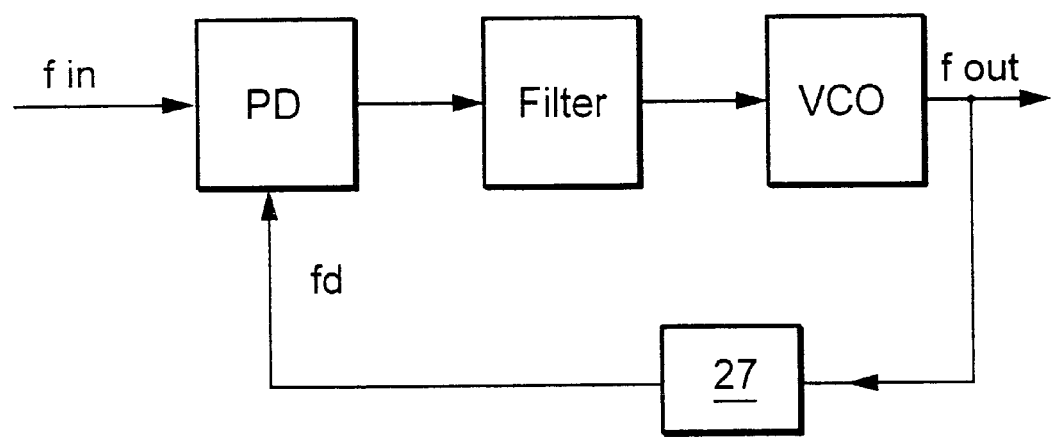
FIG. 5 shows a block diagram of a phase-locked loop.

The FSK method described above is used for transmission over data bus 1. Both control unit 2 and removable seats 28 and 29 containing the electronics have corresponding means for sending and receiving FSK-modulated signals. A basic component of frequency shift keying is the phase-locked loop. FIG. 5 shows the phase-locked loop (PLL) as a block diagram. An input frequency fin and a second input frequency fd enter a phase detector PD via a first input. A phase difference signal, which is filtered by a block identified as Filter is generated here and possibly also amplified. This signal then controls a VCO (voltage-controlled oscillator). The magnitude of this signal therefore determines which frequency fout is present at the VCO output. This frequency fout is then used, for example, for transmission. Block 27 divides this output signal by a fixed constant N, producing the signal having frequency fd. The characteristic of the phase-locked loop must now be adjusted until there is no longer any difference between fin and fd. It is thus possible to adjust to a fixed output frequency fout. This is determined by the parameters of the block filter and those of the VCO. In addition to an oscillator, another means of generating a frequency is a frequency synthesizer, with it being possible to use counters for demodulation. These means for sending and receiving FSK signals are assigned to the constraint means on the secondary side. They may be assigned, for example, to drivers 10 and 15.

What is claimed is:

1. A data bus for constraint devices in a vehicle, comprising:
    inductive transformers for connecting each of the constraint devices as a bus station to the data bus,
    wherein a control unit for the constraint devices is connected as another bus station to the data bus,
    wherein data is transmitted over the data bus using frequency shift keying signals, and
    wherein the data includes a start bit, a bus station identifier and an information field for evaluating a respective bus station.

2. The data bus according to claim 1, wherein each of the transformers has a primary side and a secondary side, the primary side being situated in a chassis of the vehicle and the secondary side being situated in a seat of the vehicle.

3. The data bus according to claim 1, further comprising a power supply line, and wherein, in the event of a deployment of the constraint devices, the control unit signals the deployment to the constraint devices over the power supply line.

4. A bus station for connecting to a data bus, comprising:
    means for sending and receiving data over the data bus using frequency shift keying signals;
    wherein the data bus is for constraint devices in a vehicle, the data bus including inductive transformers for connecting each of the constraint devices as the bus station to the data bus;
    wherein a control unit for the constraint devices is connected as another bus station to the data bus; and
    wherein the data includes a start bit, a bus station identifier and an information field for evaluating a respective bus station.

5. The bus station according to claim 4, wherein the means for sending and receiving the frequency shift keying signals includes at least one phase-locked loop.

6. A bus station for connecting to a data bus, comprising:
    an arrangement for sending and receiving data over the data bus using frequency shift keying signals;
    wherein the data bus is for constraint devices in a vehicle, the data bus including transformers for connecting each of the constraint devices as the bus station to the data bus;
    wherein a control unit for the constraint devices is connected as another bus station to the data; and
    wherein the data includes a start bit, a bus station identifier and an information field for evaluating a respective bus station.

7. The bus station according to claim 6, wherein the arrangement for sending and receiving the frequency shift keying signals includes at least one phase-locked loop.

* * * * *